Oct. 4, 1949.  H. A. ZIOLA  2,483,866
CIRCUIT CONTROL MEANS

Filed Sept. 21, 1946  2 Sheets-Sheet 1

INVENTOR.
Henry A. Ziola
BY
Hoodling and Krost
attys.

Oct. 4, 1949.  H. A. ZIOLA  2,483,866
CIRCUIT CONTROL MEANS
Filed Sept. 21, 1946  2 Sheets-Sheet 2

INVENTOR.
Henry A. Ziola
BY
Coodling and Krost
attys.

Patented Oct. 4, 1949

2,483,866

UNITED STATES PATENT OFFICE 2,483,866

CIRCUIT CONTROL MEANS

Henry A. Ziola, Mansfield, Ohio, assignor to Dominion Electrical Manufacturing, Inc., a corporation of Ohio Application September 21, 1946, Serial No. 698,497

2 Claims. (Cl. 219—20)

My invention relates to circuit controls for controlling the energization of resistance elements in heating devices.

One of the objects of my invention is the provision of a circuit control for controlling the energization of the various resistance elements in a heating device to avoid drawing excessive watts energy from a source of electrical energy.

Another object of my invention is the provision of a heating device having heater units with resistance elements therein and a circuit control with a thermostatic switch means cooperating therewith for controlling the energization of the resistance elements.

Another object of my invention is the provision of a heating device having more than one heater unit with a circuit control for controlling the energization of the resistance elements of the heater units whereby energy cannot be used at a rate greater than the rate at which the energy may be safely supplied from an electrical source of energy.

Another object of my invention is the provision of a circuit control for a heating device whereby at least a resistance element of one heater unit may be connected to a source of electrical energy and whereby at least one resistance element in each of at least two heater units may be connected to the source of electrical energy.

Another object of my invention is the provision of a circuit control for a heating device whereby at least a resistance element of one heater unit may be connected to a source of electrical energy and whereby at least one resistance element in each of at least two heater units may be connected to the source of electrical energy, with the total energy drawn by the heating device being less than a safe predetermined value.

Another object of my invention is to provide a circuit control which will permit energization of the heating units of a heating device in various amounts and at the same time prevent the drawing of excessive energy from a source of electrical energy.

Another object is the provision of a circuit control for controlling the energization of various resistance elements in a heating device to obtain various heats therefrom.

Another object of my invention is to control the energization of the resistance elements in the heating units of a heating device whereby one heating unit may use a predetermined amount of watts energy or the heating units may use variable amounts of energy, with the total energy used never greater than the predetermined amount of watts energy which may safely be drawn from the source of electrical energy.

Other objects and a fuller understanding of my invention may be had by referring to the following description and claims, taken in conjunction with the accompanying drawing, in which:

Figure 1:
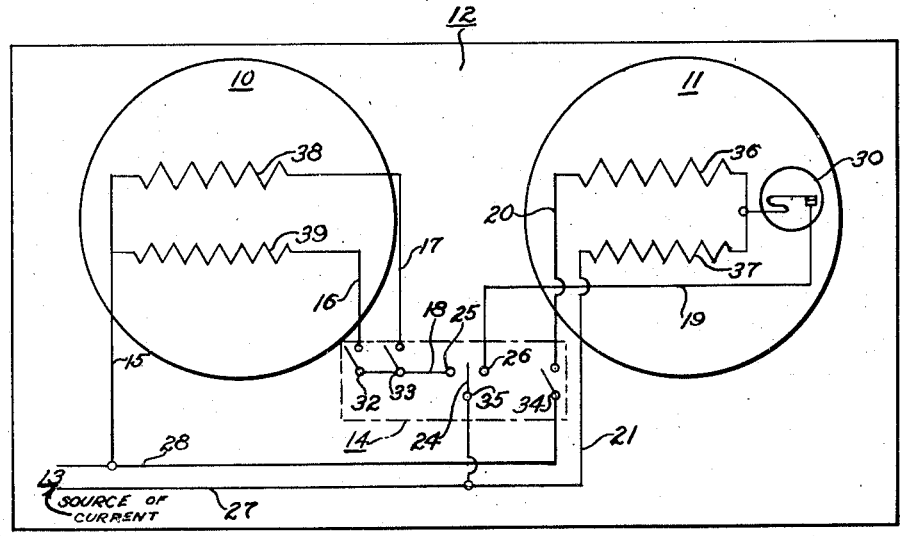
Figure 1 is a circuit diagram illustrating the features of my circuit control.

In Figure 1 of the accompanying drawing, I have illustrated symbolically the wiring diagram of my electrical heating device, which may be incorporated into a two-plate hot plate for cooking. My heating device is designed for safe use in the average home. Household heating devices generally are not safe if they can draw a load of energy greater than 1650 watts at 115 volts from the outlet wall socket. My heating device may be used in the average home without fear of overloading the 115 volt electrical circuits or overheating the heating device. It is understood that I do not wish to limit the scope of my invention to hot plates or to the specific values used in this description, but am using them to better illustrate the features of my invention.

I have designated my heating device, for descriptive purposes, as having a heater unit 10 and a heater unit 11. As is best illustrated in Figure 1, the heater units 10 and 11 may be combined into a single heating device by a suitable casing 12. The heater unit 10 has a resistance element 38 and a resistance element 39. Similarly, the heater unit 11 has a resistance element 36 and a resistance element 37. These resistance elements are connected by suitable circuit connectors 15 to 21 inclusive, to the lines 27 and 28 of a source of electrical energy 13.

A circuit control 14 controls the energization of the resistance elements 36 and 37 in the heater unit 11 and the resistance elements 38 and 39 in the heater unit 10. The circuit control 14, as is herein described, includes single pole single throw switches 32, 33 and 34, and also a single pole double throw switch 35. These switches are connected in circuit with the resistance elements by the circuit connectors to control the energization of the resistance elements in the heater units 10 and 11.

Although resistances of other heating capacities may be used for heating devices for other purposes, in my household hot plate heating device, which is designed to operate on 115 volts, I use a 1650 watt resistor for the resistance element 36, a 1070 watt resistor for the resistance element 37, a 650 watt resistor for the resistance element 38, and a 350 watt resistor for the resistance element 39. It can readily be seen that since the 1650 watts energy consumed by the resistance element 36 is the same as the maximum safe watts energy which can be drawn from the source of electrical energy 13, that by connecting the heater units 10 and 11 to the source of electrical energy 13 at one time, a dangerous overload can be caused on the source of electrical energy 13. My circuit control 14 which includes switches 32, 33, 34 and 35 allows me to use either one or both of the heater units without fear of overloading the source of electrical energy.

Referring again to Figure 1, the circuit connector 15 connects one side of the resistance element 38 and one side of the resistance element 39 to the line 28 of the source of electrical energy 13. The circuit connector 16 connects the other side of the resistance element 39 to one terminal of the single pole single throw switch 32. The circuit connector 17 similarly connects the other side of the resistance element 38 to one terminal of the single pole, single throw switch 33. The other terminals of the switches 32 and 33 are connected by the circuit connector 18 to a contact terminal 25 of the single pole double throw switch 35. The switch 35 has a movable switch member 24 connected to the line 27 of the source of electrical energy 13. This switch member 24 may be closed against the contact terminal 25 to energize the resistance elements 38 and 39 of the heater unit 10 when switches 32 and 33 are closed.

The resistance elements 36 and 37 in the heater unit 11 are connected together on one end thereof and by the circuit connector 19 to a contact terminal 26 of the single pole double throw switch 35. The switch member 24 in the single pole double throw switch 35 may be closed against the contact terminal 26 to connect one side of the resistance elements 36 and 37 to the line 27 of the source of electrical energy 13. The other side of the resistance element 36 is connected by the circuit connector 20 to one terminal of the switch 34. The other terminal of the switch 34 is connected to the line 28 of the source of electrical energy 13. Similarly, the other side of the resistance element 37 in the heater unit 11 is connected by a circuit connector 21 directly to the line 27 of the source of electrical energy 13. I have installed a thermostatic switch 30 in the connector 19 which connects the resistance elements 36 and 37 in the heater unit 11 to the contact terminal 26 of the single pole double throw switch 35. The thermostatic switch 30 operates when the temperature of the heater unit 11 reaches a predetermined value to open the circuit connector 19. By using this thermostatic switch 30, I am able to quickly heat the heater unit 11 with the 1650 watt resistance element 36 to the predetermined temperature and then keep the heater unit 11 at that temperature with the resistance elements 36 and 37 in series. The resistance elements operating in series draw less than the 1650 watts energy from the source of electrical energy.

In operation, when the switch member 24 of the switch 35 is closed against the contact terminal 25 and the switch 32 is closed, the resistance element 39 in the heater unit 10 is in circuit, thus drawing 350 watts from the source of electrical energy. When the switch member 24 of the switch 35 is closed against the contact terminal 25 and the switch 33 is closed, the resistance element 38 in the heater unit 10 is energized by the source of electrical energy 13, thus the heater unit 10 is drawing 650 watts energy. When both switches 32 and 33 are closed the heater unit 10 is drawing 1000 watts energy, which is the maximum the heater unit 10 can safely draw from the 1650 watt source of electrical energy 13.

When the switch 34 is closed, the resistance elements 36 and 37 in the heater unit 11 are in series across the source of electrical energy, thus the heater unit 11 is drawing approximately 650 watts energy from the source of electrical energy. When the switch 34 is closed and the switch member 24 is closed against the contact terminal 26 of switch 35, the resistance element 36 is drawing 1650 watts through thermostatic switch 30 from the source of electrical energy 13. As soon as the temperature of the heater unit 11 reaches a predetermined value, the thermostatic switch 30 opens, thus causing the resistance elements 36 and 37 to be in series. When the resistance elements 36 and 37 are in series the heater unit 11 will draw about 650 watts energy.

At no time can there be over 1650 watts drawn by either the heater unit 10, the heater unit 11, or the two heater units 10 and 11 acting simultaneously and in parallel from the source of electrical energy 13. The heater units 10 and 11 operate simultaneously when the switch member 24 is closed against the contact terminal 25 of switch 35 and when the switch 34 is closed. With these switches 34 and 35 in this position, and with switches 32 and 33 closed, the heater unit 10 will draw a total of 1000 watts energy and the heater unit 11 will draw a total of 650 watts energy. The resistance elements 36 and 37 of the heater unit 11 are in series across the source of electrical energy 13 when the heater units are operating simultaneously.

Figure 2:
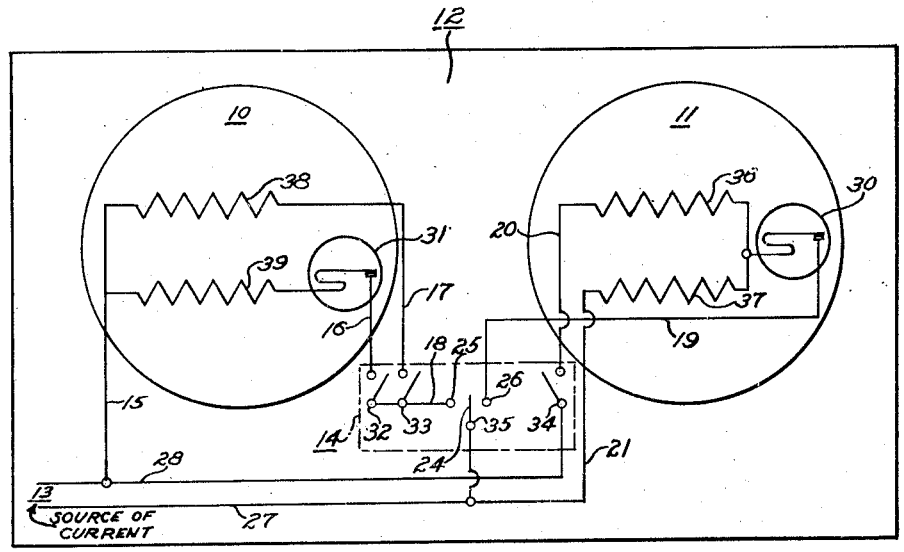
Figure 2 is a modification of the circuit diagram of Figure 1.

In Figure 2 of my drawing, I have illustrated a modification of my electrical heating device. In this modification, I have inserted a thermostatic switch 31 in series with a resistance element, in the heater unit 10. When the heater unit 10 is heated to a predetermined temperature by the resistance elements 38 and 39 the thermostatic switch 31 automatically opens to disconnect the resistance element 39 from the circuit. By using this thermostatic switch 31, the resistance element 39 may be used as a booster element. That is, it may be used to quickly heat the heater unit 10 to the desired temperature after which only the resistance element 38 keeps the heater unit at that temperature.

Figure 3:
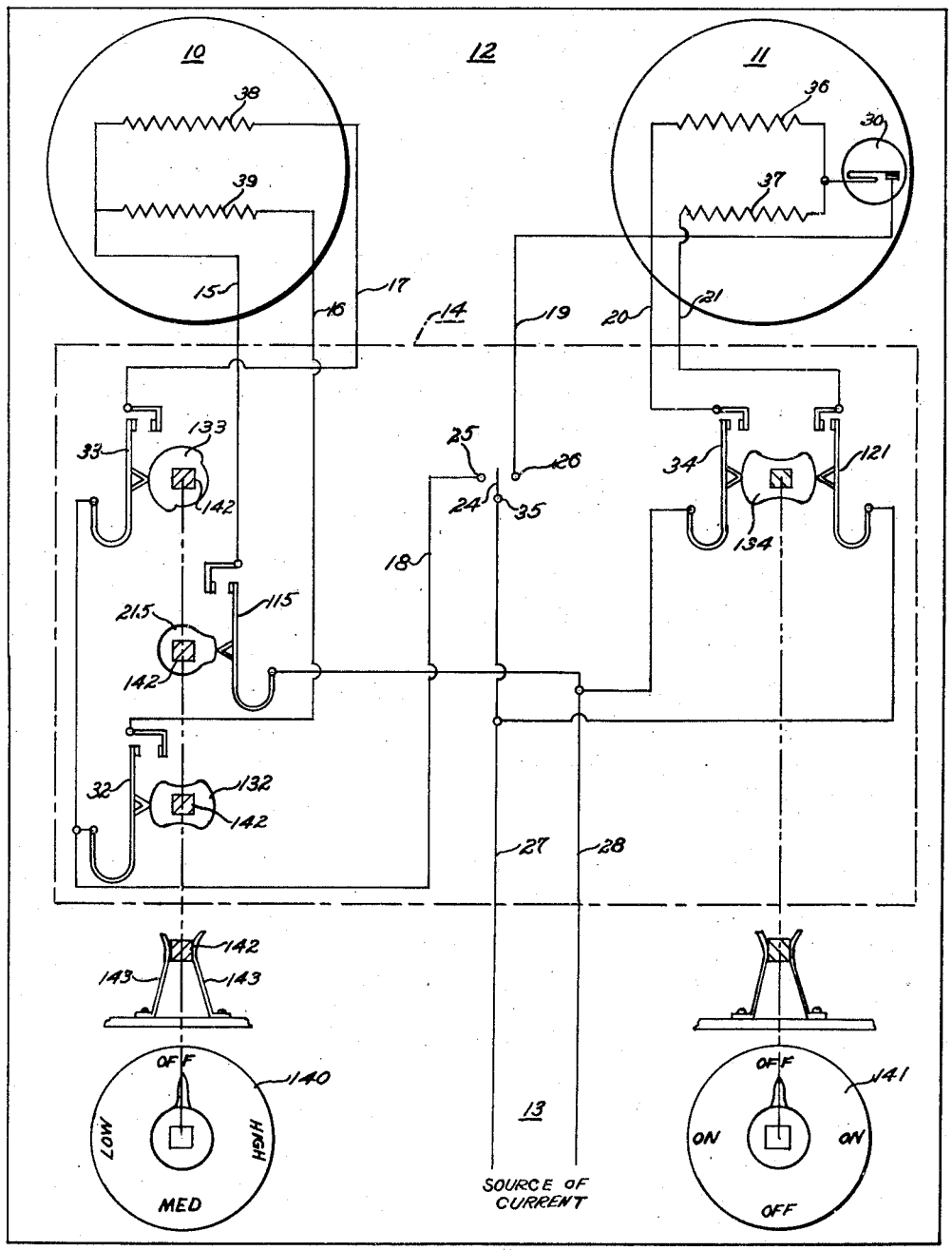
Figure 3 is a circuit diagram illustrating a modification of my circuit control.

In Figure 3 of my drawing I illustrate a modification of my circuit control. In this modification the circuit control 14 disconnects the resistance elements entirely from the source of electrical energy. The modified circuit control 14 comprises the single pole double throw master switch 35, a rotary gang switch 140 for the heater unit 10 and a rotary switch 141 for the heater unit 11.

The rotary switch 140 has a cam mechanism 132 for operating the switch 32, a cam mechanism 133 for operating the switch 33 and a cam mechanism 215 for operating a switch 115 in the connector 15. As is illustrated in my drawing the gang switch is a four-position switch. These positions have been labeled, Off, Low, Medium and High. To hold the switch in any one of these positions I have provided it with a square shank 142 which rotates between spring clips 143. The clamps press on the sides of the shank 142 to prevent the switch from changing the position because of jarring, or normal handling. The switch must be manually turned to change it from one position to another position.

The rotary switch 141 operates very similar to the switch 140 in that it has a cam mechanism 134 which operates the switch 34 and a switch 121 in the connector 21. The rotary switch 141 has an "on" position and an "off" position. When the switch is rotated to the "on" position both switches 34 and 121 are closed, thus connecting the resistance elements 36 and 37 in the heater unit 11 in series to the source of electrical energy. When the switch is rotated to the "off" position both switches 34 and 121 are open.

The operation of my modification illustrated in Figure 3 and using rotary switches is very similar to that of Figure 1. With the rotary switch 140 in the "off" position the cam mechanisms hold all the switches 32, 33 and 115 open, thus the resistance elements of unit 10 are entirely disconnected from the source of electrical energy.

With the master switch closed to energize the heater unit 10 and the rotary switch 140 in the low position the cam 132 permits the switch 32 to close and the cam 215 permits the switch 115 to close. The resistance element 39 is connected to the source of electrical energy at this time.

With the master switch closed to energize the heater unit 10, and the rotary switch 140 in the "medium" position, the cam 133 permits the switch 33 to close and the cam 215 permits the switch 115 to close. The resistance element 38 is connected to the source of electrical energy at this time.

With the master switch closed to energize the heater unit 10 and the rotary switch 140 in the "high" position the cam 132 permits the switch 32 to close, the cam 133 permits the switch 33 to close, and the cam 215 permits the switch 115 to close. The resistance elements 38 and 39 are connected in parallel to the source of electrical energy.

At any time while the master switch is closed to energize the heater unit 10, or is in open position, the rotary switch 141 may be closed to connect the resistance elements of the right heater unit 11 in series to the source of electrical energy.

With the master switch closed to energize the heater unit 11 only the heater unit 11 can be energized. When the rotary switch 141 is turned to the "on" position, the resistance element 36 is connected to the source of electrical energy. As soon as the heater unit 11 reaches a predetermined temperature the thermostatic switch 30 will open to connect the resistance elements 36 and 37 in the heater unit 11 in series to the 115 volt source of electrical energy or household outlet.

As with my preferred circuit control illustrated in Figures 1 and 2, my modified circuit control illustrated in Figure 3 provides a heating device which has a variety of heats. At no time, however, can the heat exceed a predetermined quantity. The heat is limited by the watts energy which may be drawn from the source of electrical energy. The circuit control permits use of different resistance elements of the heating units to obtain these different heats in the heating units and at the same time prevents more than 1650 watts energy being drawn from the 115 volt source of electrical energy.

Although I have described my invention with a certain degree of particularity in its preferred form, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In an electrical heating device, a first and second heating unit each including a first and second heating resistance element, a circuit means for connecting the resistance elements of said units to a source of electrical energy, circuit control means in said circuit means and controlling the energization of said resistance elements, said circuit control means comprising, a first thermostatic switch disposed in the first heating unit and connected in series with the first resistance element thereof to effect energization of said first resistance element when the first heating unit is below a predetermined temperature, switch means including a plurality of contact elements arrangeable in a first position to connect the first resistance element of the first heating unit and the first thermostatic switch connected in series therewith in parallel with the second resistance element of the first heating unit to the source of electrical energy and also to connect the resistance elements of the second heating unit in series to the source of electrical energy, said contact elements arrangeable in a second position to connect the first and second resistance elements of the second heating unit in series to the source of electrical energy, and second thermostatic switch means disposed with the second heating unit and cooperating with the said switch contact elements to effect the short circuit of one of the resistance elements of the second unit when the second heating unit is below a predetermined temperature and to effect the energization of the first and second resistance elements of the second heater unit in series when the second heating unit is above the predetermined temperature.

2. A circuit control for controlling the energization of the resistance elements in the heater units of a heating device, said heating device having circuit connection means to connect the resistance elements to the source of electrical energy, said circuit control comprising first switch means, a second switch, a thermostatic switch, and a master switch interconnected with said first switch means, said second switch, and said thermostatic switch, said master switch and said first switch means when in a first position cooperating to connect a resistance element of a first heater unit in series with said thermostatic switch and to the source of electrical energy, said master switch and said first switch means cooperating to connect one resistance element of the first heater unit and the thermostatic switch connected in series therewith in parallel with another resistance element in the first heater unit and to the source of energy when the master switch is arranged in the first position and the first switch means is arranged in a second position, said master switch and said second switch cooperating to connect the resistance elements of the second heater unit in series and to the source of electrical energy, said switches and switch means cooperating to connect at least one of the resistance elements of the first heater unit to the source of electrical energy and to simultaneously connect the resistance elements of the second heater unit in series and to the source of electrical energy.

HENRY A. ZIOLA.

REFERENCES CITED

The following references are of record in the file of this patent:

UNITED STATES PATENTS

| Number | Name | Date |
| --- | --- | --- |
| 955,479 | Shaler | Apr. 19, 1910 |
| 1,154,954 | Williams | Sept. 28, 1915 |
| 1,359,889 | Gumaer | Nov. 23, 1920 |
| 1,426,411 | Rogers | Aug. 22, 1922 |
| 1,943,310 | Heise | Jan. 16, 1934 |
| 1,954,147 | Shroyer | Apr. 10, 1934 |
| 2,015,624 | Griswold | Sept. 24, 1935 |
| 2,101,430 | Goldbert et al. | Dec. 7, 1937 |
| 2,134,805 | Sessions | Nov. 1, 1938 |
| 2,152,560 | Myers | Mar. 28, 1939 |
| 2,279,525 | Rogers | Apr. 14, 1942 |
| 2,415,275 | Bruckman | Feb. 4, 1947 |